United States Patent
Tang et al.

(10) Patent No.: US 10,664,100 B2
(45) Date of Patent: May 26, 2020

(54) MISALIGNMENT DETECTION

(71) Applicant: Hewlett-Packard Development Company, L.P., Houston, TX (US)

(72) Inventors: Yun Tang, San Diego, CA (US); Jinman Kang, San Diego, CA (US); David Bradley Short, San Diego, CA (US); Daniel R Tretter, San Jose, CA (US); Kar Han Tan, Sunnyvale, CA (US); Amit A Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 15/500,831

(22) PCT Filed: Jul. 31, 2014

(86) PCT No.: PCT/US2014/049307
§ 371 (c)(1),
(2) Date: Jan. 31, 2017

(87) PCT Pub. No.: WO2016/018418
PCT Pub. Date: Feb. 4, 2016

(65) Prior Publication Data
US 2017/0228100 A1 Aug. 10, 2017

(51) Int. Cl.
*G06F 3/041* (2006.01)
*G03B 17/54* (2006.01)
*G03B 21/30* (2006.01)
*G06F 3/0354* (2013.01)
*G06F 3/042* (2006.01)
*G06F 3/0488* (2013.01)

(52) U.S. Cl.
CPC .......... *G06F 3/0418* (2013.01); *G03B 17/54* (2013.01); *G03B 21/30* (2013.01); *G06F 3/03547* (2013.01); *G06F 3/0428* (2013.01); *G06F 3/0488* (2013.01)

(58) Field of Classification Search
None
See application file for complete search history.

(56) References Cited

U.S. PATENT DOCUMENTS 7,256,772 B2   8/2007   Morrison
7,599,561 B2   10/2009  Wilson et al.
(Continued)

FOREIGN PATENT DOCUMENTS

KR   10-2013-0138225 A   12/2013

OTHER PUBLICATIONS

Fernandez etal, "Planar-Based Camera-Projector Calibration," 7th International Symposium on Image and Signal Processing and Analysis, Sep. 2011, pp. 1-6, IEEE.
(Continued)

*Primary Examiner* — Stephen T. Reed
(74) *Attorney, Agent, or Firm* — HP Inc. Patent Department

(57) ABSTRACT

Examples disclosed herein relate to detecting misalignment of a touch sensitive mat. Examples include detecting corners of the touch sensitive mat, determining a set of reference corners, performing a comparison of the detected corners of the mat with the set of reference corners, and determining a level of misalignment based on the comparison.

16 Claims, 9 Drawing Sheets

(56) References Cited

U.S. PATENT DOCUMENTS

| | | | |
|---|---|---|---|
| 7,626,578 B2 | 12/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,591,039 B2 | 11/2013 | Morrison et al. | |
| 8,736,583 B2 | 5/2014 | Anderson et al. | |
| 2005/0078092 A1 | 4/2005 | Clapper | |
| 2005/0260986 A1 | 11/2005 | Sun et al. | |
| 2006/0007170 A1* | 1/2006 | Wilson | G06F 3/0418 345/173 |
| 2006/0203207 A1 | 9/2006 | Ikeda et al. | |
| 2007/0177115 A1 | 8/2007 | Yin et al. | |
| 2008/0018591 A1 | 1/2008 | Pittel et al. | |
| 2008/0042999 A1 | 2/2008 | Martin | |
| 2010/0103330 A1* | 4/2010 | Morrison | G06F 3/0412 348/744 |
| 2011/0242054 A1 | 10/2011 | Tsu | |
| 2011/0285910 A1* | 11/2011 | Bamji | G01S 17/89 348/631 |
| 2011/0316767 A1* | 12/2011 | Avrahami | G06F 1/1626 345/156 |
| 2012/0313910 A1* | 12/2012 | Haraguchi | H04N 9/3179 345/207 |
| 2013/0077236 A1 | 3/2013 | Becze et al. | |
| 2013/0121601 A1* | 5/2013 | Yu | G06T 7/00 382/224 |
| 2014/0168367 A1* | 6/2014 | Kang | G06T 7/85 348/46 |
| 2014/0292647 A1* | 10/2014 | Murase | G03B 17/54 345/156 |

OTHER PUBLICATIONS

Shahram Izadi et al., "C-Slate: A Multi-Touch and Object Recognition System for Remote Collaboration using Horizontal Surfaces,", pp. 3-10, IEEE.

Wilson etal , "Combining Multiple Depth Cameras and Projectors for Interactions On, Above, and Between Surfaces," UIST '10, Oct. 3-6, 2010, pp. 1-10, ACM.

* cited by examiner

MISALIGNMENT DETECTION

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations. However, optimum ergonomic placement, of a display for simply viewing an image thereon is often at odds with such placement for engaging in touch interaction therewith. Thus, users desiring to use a single computer system for both traditional viewing applications as well as touch interactive application often encounter difficulties in positioning and/or utilizing such systems.

BRIEF DESCRIPTION OF THE DRAWINGS

For detailed description of various examples, reference will now be made to the accompanying drawings in which.

NOTATION AND NOMENCLATURE

Figure 1:
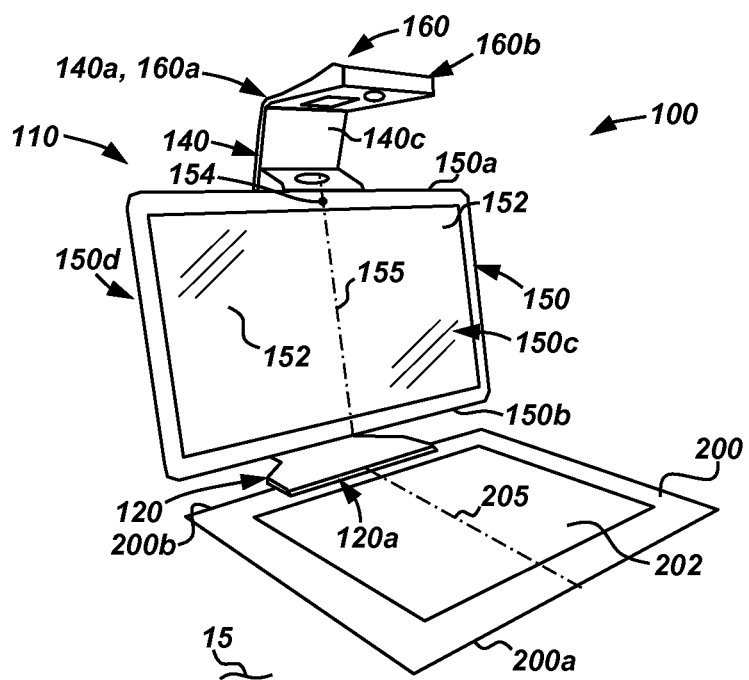
FIG. 1 is a schematic perspective view of an example of a computer system in accordance with the principles disclosed herein.
Figure 2:
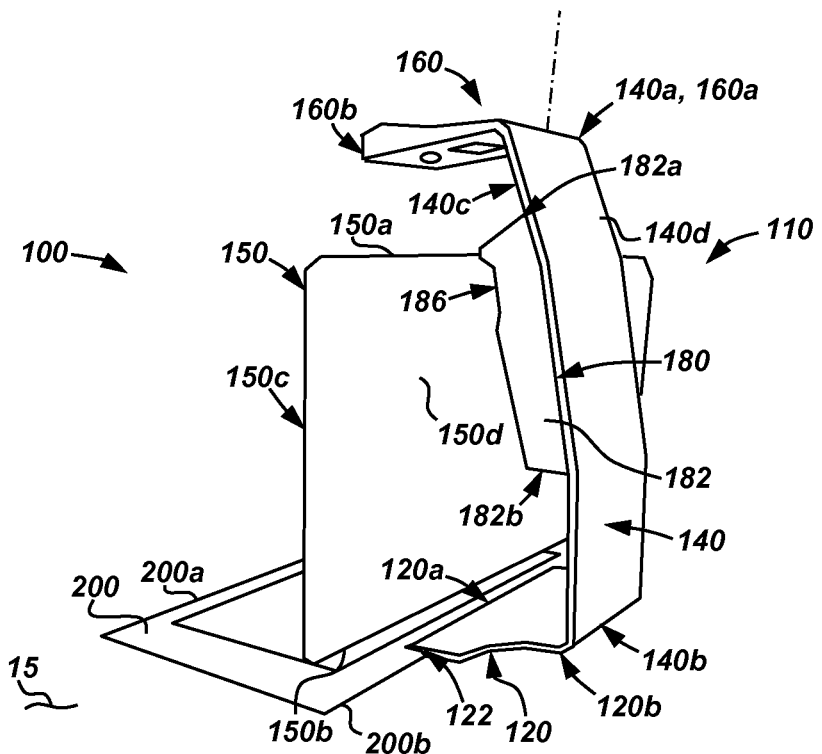
FIG. 2 is another schematic perspective view of the computer system of FIG. 1 in accordance with the principles disclosed herein.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean Including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition as used herein, the phrase "user input device" refers to any suitable device for providing an input by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Examples disclosed herein provide the ability to align components of a computer system in order to effectively integrate the functionality of a touch sensitive surface, projector assembly, and sensor bundle within a defined area Alignment between at least the projector assembly and the touch sensitive surface may ensure that interactions between assembly and the surface are correctly correlated. Further, examples disclosed herein achieve the alignment without the need for user input and accordingly, without interrupting user experience.

Referring now to FIGS. 1-4, a computer system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b, The lower end 140b of member 140 is coupled to the rear end 1201) of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100, in some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage, with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
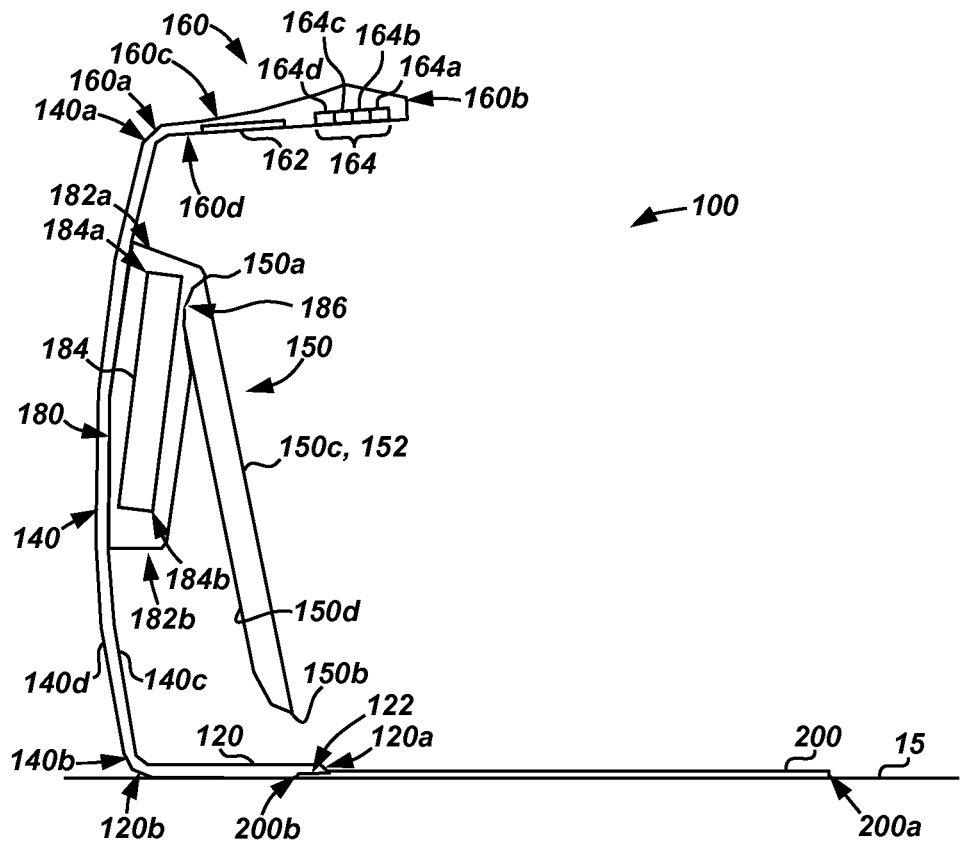
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general, member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
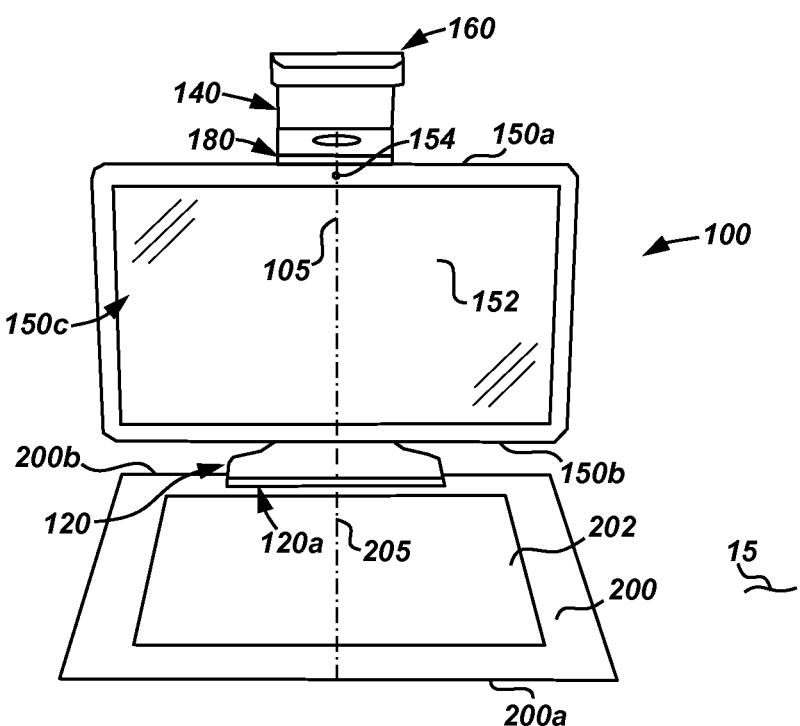
FIG. 4 is a schematic front view of the computer system of FIG. 1 in accordance with the principles disclosed herein.

Thus, referring briefly to FIG. 4, when device 150 is suspended from structure 110 through the mounting member 188 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 18:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLU-ETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162s that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d, Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of R light, a dual IR camera sensor with a uniform flood of IR light, structured light depth sensor technology, time-of-flight (TOE) depth sensor technology, or some combination thereof. User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLU-ETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
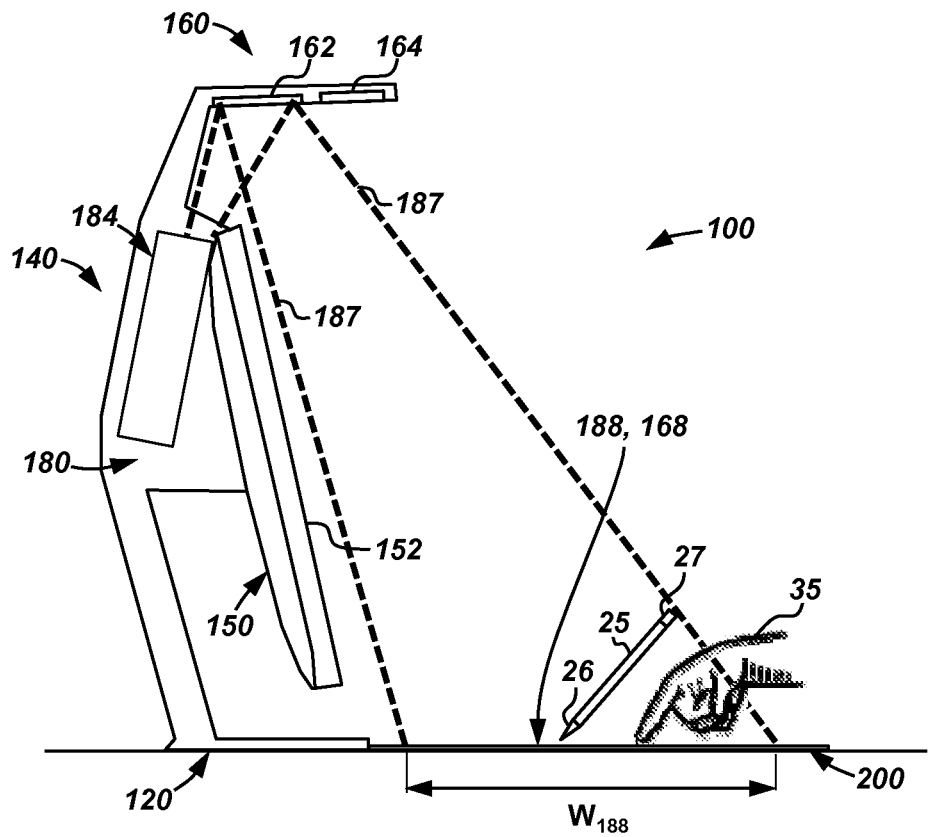
FIG. 5 is a schematic side view of the computer system of FIG. 1 during operation in accordance with the principles disclosed herein.
Figure 6:
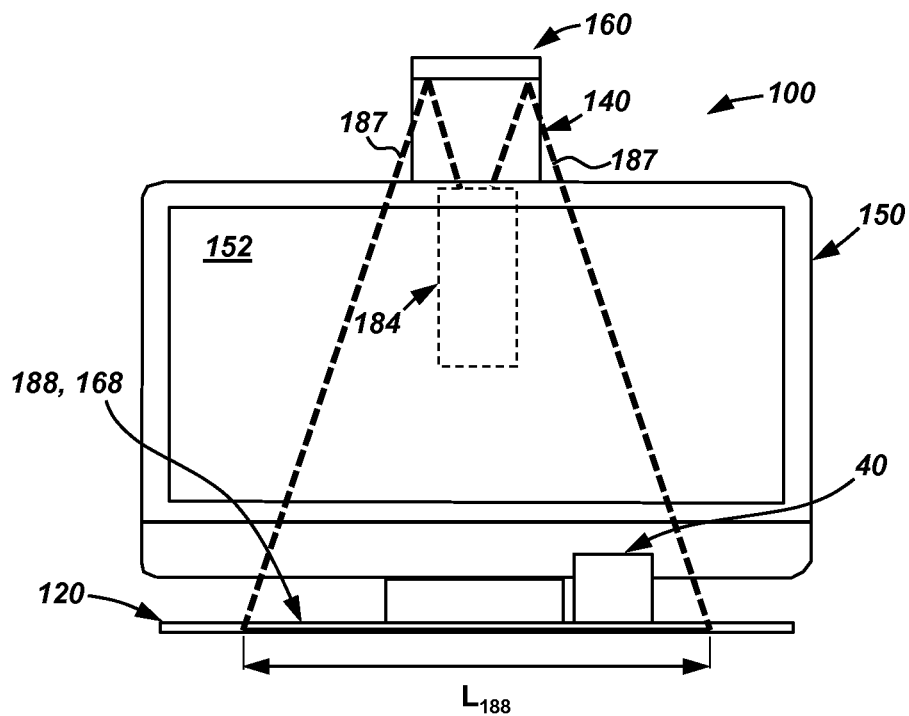
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{186}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described.

In some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as, direct interaction with a user's hand 35, through a stylus 25, or other suitable user input device(s).

Although the computer system 100 may, be delivered to a user with factory calibrated settings, misalignment of various components of the system 100 may occur due to various reasons, such as a loose connection, mechanical conditions, or user interaction. As an example, changes in temperature may cause components of the system 100, such as the touch sensitive surface 202 of the mat 200, to thermally expand or contract resulting in potential misalignment with respect to other components of the system 100 (e.g., the projector assembly 184 and/or the sensor bundle 164).

Misalignment of one or more components of the system 100 may affect the integrated functionality of the touch sensitive surface 202, projector assembly 184, and sensor bundle 164 within a defined area (e.g., the surface 202). For example, sensors of the sensor bundle 164 may inadvertently change positions with respect to the touch sensitive surface 202 and/or the projector assembly 184, positioning of the surface 202 may inadvertently change with respect to the sensor bundle 184 and/or the projector assembly 184, or both the sensor bundle 164 and the surface 202 may inadvertently change positions with respect to the projector assembly 184.

Although the computer system 100 may be delivered to a user with factory calibrated settings, the system 100 may include a program for determining misalignment of the components within the system 100 with respect to each other, which then leads to a realignment effort to recalibrate the system 100. The program may be initiated by software executing within the device 150. As an example, the misalignment determination program may verify whether the touch sensitive mat 200 is properly aligned as will be further described. As an example, the misalignment program may be executed automatically, at power down of the projector assembly 184 (e.g., the project assembly 184 is in idle/standby mode), if the misalignment of components within the system 100 is detected, calibration operations may be performed.

Figure 8:
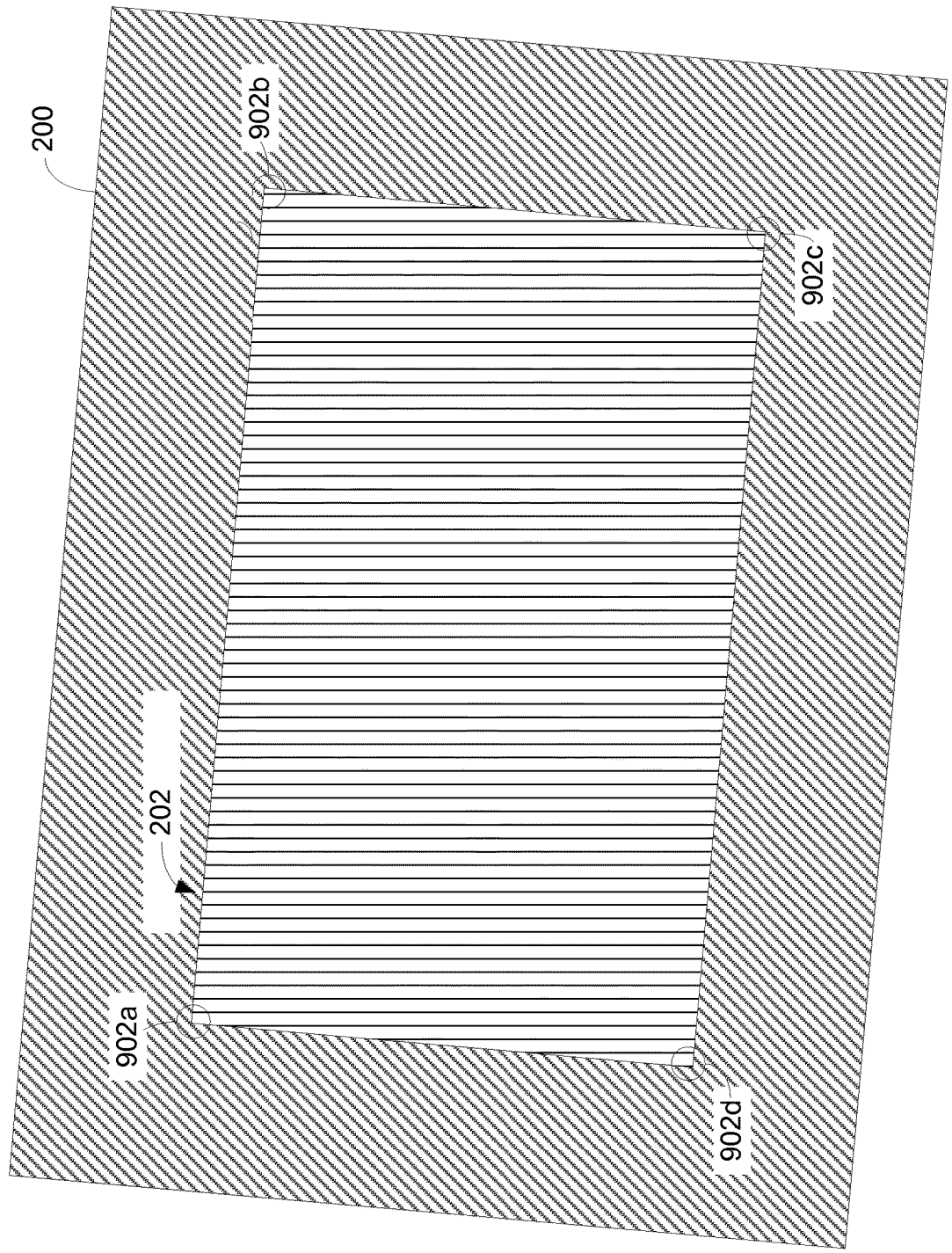
FIG. 8 provides an example of the detection of the corners of the touch sensitive surface on the touch sensitive mat in accordance with the principles disclosed herein.

FIG. 8 provides an example of the touch sensitive surface 202 of the touch sensitive mat 200 misaligned. More specifically, the touch sensitive mat 200 is rotated, for example, by 5 degrees, such that the surface 202 of the mat 200 is misaligned. As an example, the mat 200 may be inadvertently rotated due to user interaction with the mat 200 or a loose connection. Accordingly, the portions of the touch sensitive surface 202 of the mat 200 may not be responsive to interactions from a user, for example, via the user's hand 35 or stylus 25. Other examples for misalignment may include the area of surface 202 thermally expanding due to changes in temperature, such that the border of the surface 202 has shifted.

In one implementation, misalignment of the mat 200 within the system 100 may be verified by detecting corners 902a-d of the touch sensitive surface 202. The mat 200 may be designed such that a spectral reflectance characteristic of the touch sensitive surface 202 may be different from a spectral reflectance characteristic of a border of the mat 200 surrounding a perimeter of the touch sensitive surface 202. For example, the touch sensitive surface 202 and the border of the mat 200 may each reflect different frequencies (e.g., due to the different spectral reflectance characteristics) as detected by sensors from the sensor bundle 164. Examples of the spectral reflectance characteristic include materials that reflect various wavelengths, such as ultraviolet, visible light, and infrared. As an example, the different spectral reflectance characteristics may correspond various colors or IR coatings. The different spectral reflectance characteristics may serve as fiducial objects in order to detect the four corners of the touch sensitive surface 202.

Figure 7:
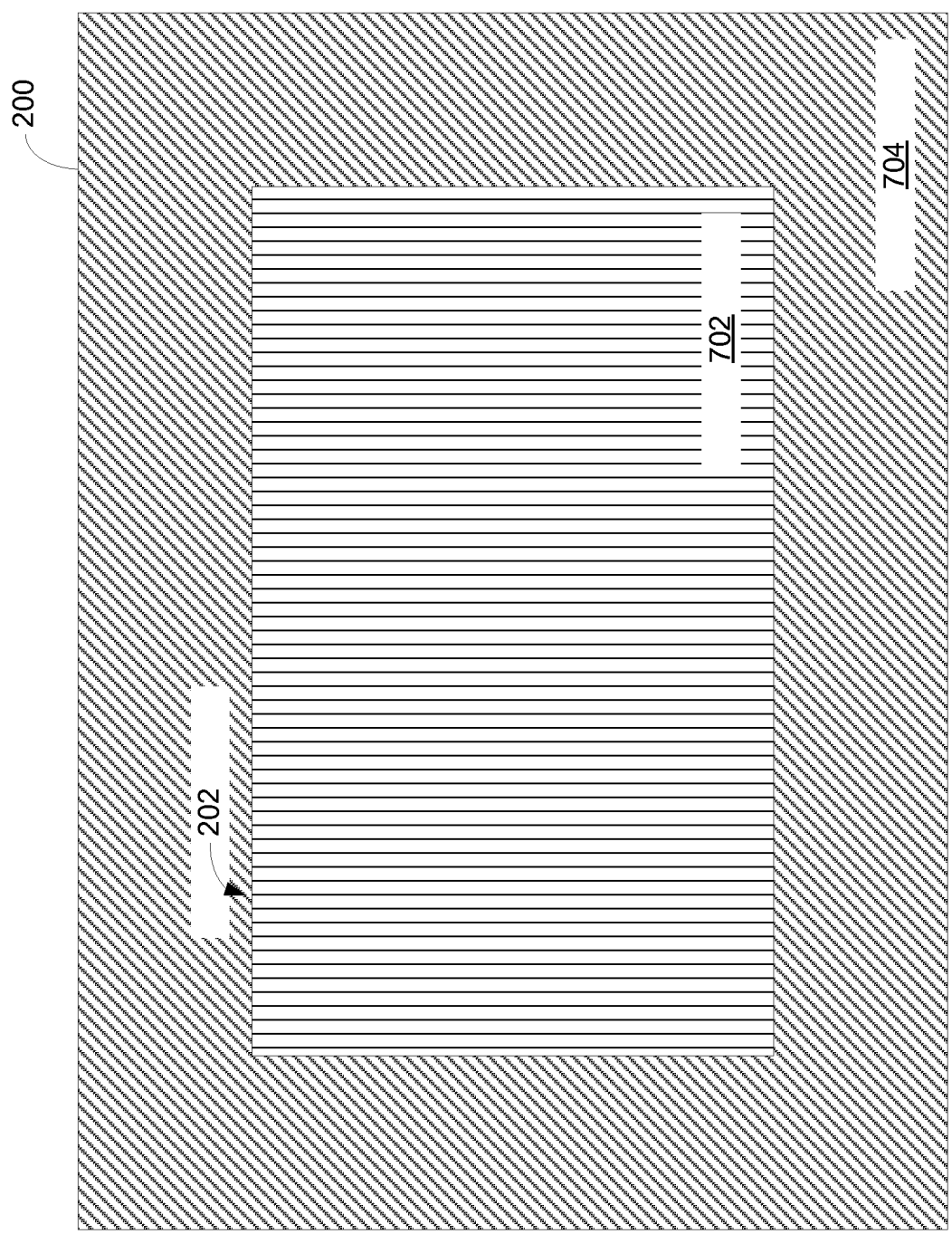
FIG. 7 is a schematic top view of the touch sensitive mat of FIG. 1 during operation in accordance with the principles disclosed herein.

The difference in the spectral reflectance characteristic may be slight but with a sufficient contrast ratio for sensors from the sensor bundle 164 to be able to differentiate the first spectral reflectance characteristic of the touch sensitive surface 202 from the second spectral reflectance characteristic of the border of the mat 200. Referring to FIG. 7, the spectral reflectance characteristic of the touch sensitive surface 202 may be indicated by a first hatching pattern 702 and the spectral reflectance characteristic of the border of the mat 200 may be indicated by a second hatching pattern 704. The difference in the spectral reflectance characteristic between the two regions may be utilized for providing robust detection of the four corners of the touch sensitive surface 202 using, for example, an edge detection algorithm.

Referring to FIG. 7, although the border of the mat 200 is illustrated as having, a spectral reflectance characteristic 704 around the whole perimeter of the mat 200, the spectral reflectance characteristic 704 may be limited to occupy portions of the perimeter, such as the four corners of the mat 200. As a result, the spectral reflectance characteristic 702 of the touch sensitive surface 202 may be enclosed within the four corners of the spectral reflectance characteristic 704 that serve as fiducial objects for detecting the four corners of the touch sensitive surface 202. The fiducial objects may be located in various locations around the perimeter of the mat 200 and have various shapes and sizes.

Referring to the detection of the corners 902a-d of the touch sensitive surface 202, camera 164b may be used to take either a still image or a video of the whole mat 200, or at least relevant portions of the mat 200. A histogram of the image/video may provide regions of interest, generally providing an indication of the difference in color intensity between the color of the touch sensitive surface 202 (e.g., color 702) and the color of the border of the mat 200 surrounding a perimeter of the surface 202 (e.g., color 704). Histogram equalization may be performed on the regions of interest to obtain high and low thresholds for an edge detection algorithm (e.g., Canny edge detection). Upon running the edge detection algorithm, edge points indicating the perimeter of the touch sensitive surface 202 may be extracted (e.g., edge points for all four sides of the surface 202).

Figure 9:
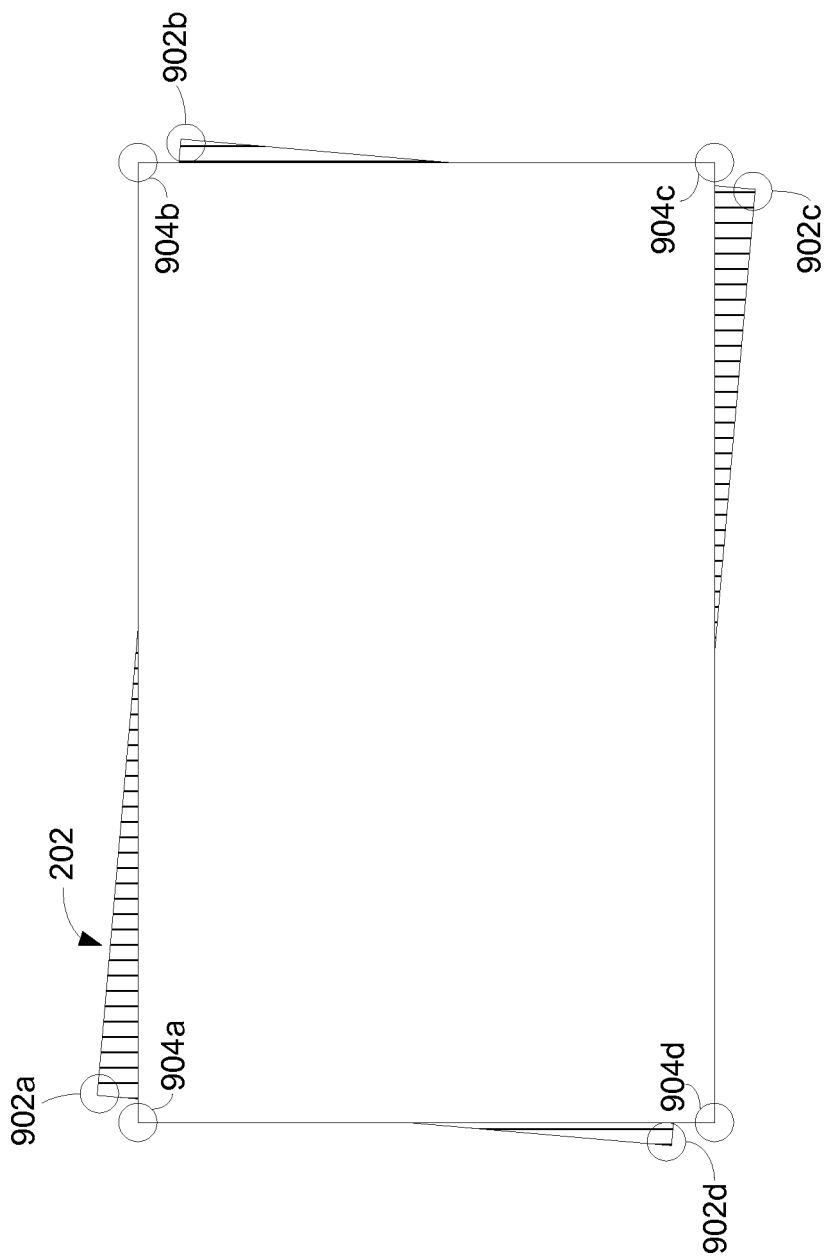
FIG. 9 provides another example of the detection of the corners of the touch sensitive surface relative to reference corners in accordance with the principles disclosed herein.

FIG. 9 provides another example of the misalignment of the touch sensitive surface 202 of the touch sensitive mat 200. The corners 902a-d represent a first set of corners, which are the corners of the touch sensitive surface 202 detected as described in greater detail in reference to FIG. 8. Corners 904a-d represent a second set of corners, which are used as a reference set of corners to be compared to the corners 902a-d. The system determines any correspondence between the two sets of corners via mapping methods, such as homography. Based upon the differences detected between the two sets of corners, calibration operations (e.g., automatic) may be performed.

In one implementation, the reference corners 904a-d may be the corners of the touch sensitive surface 202 from the last calibration of the system 100. In such implementation, the camera 154 may capture an image of the touchmat 200 including the touch sensitive surface 202 and detect the corners of the touch sensitive surface 202 (as described above in reference to FIG. 8). Once detected, the newly detected corners may be compared to the corners of the touch sensitive surface previously detected during the last calibration of the system 100. It should be noted that at each calibration, the images of the touch mat 200 including information related to the detected corners of the touch sensitive surface 202 in those images are stored by the system 100. As explained above, such stored data may be used to determine whether the system 100 requires a new calibration (e.g., recalibration) to handle any possible misalignments.

In another implementation, the reference corners 904a-d may be the corners of the touch sensitive surface 202 previously restored through two homography processes. During the previous calibration, the homography (i.e., $2^{nd}$ homography) between the corners of touch sensitive surface 202 of the touch mat 200 and projector display corners is calculated and stored. Also, the homography (i.e., $1^{st}$ homography) between the projector display corners with projector-output-defined corners is calculated and stored. The projector output coordinate remains same until a new calibration is initiated. Accordingly, based on the projector-output-defined corners and the stored results of the $1^{st}$ homography, the previously identified projector display corners can be restored. Using the previously identified projector display corners and the $2^{nd}$ homography, the previously identified corners of the touch sensitive surface 202 can be restored by invert mapping through the $2^{nd}$ homography. In such implementation, the corner detection may be triggered when the projector assembly 184 enters an idle state (e.g., standby mode), and the sensor bundle 164 identifies the corners 902a-d without the projector assembly 184 display reflected on top of the touch sensitive 200. Further, these newly detected corners 902a-d are compared to the mat corners restored during the last homography (e.g., the reference corners 904a-d).

In another implementation, misalignment between the components of the system 100 may be as a result of non-flat surface. More specifically, non-flat surfaces may increase a pitch angle corresponding to the projector assembly 184, which leads to misalignment between the mat 200 and projector assembly 184. The pitch angle may be determined by measuring the top and bottom edges of the projector display. In order to determine whether the mat 200 is flat or not, the camera 154 (e.g., the depth camera 164c) captures an image of the mat 200. Depth data may be derived from the captured image of the mat 200. The depth data indirectly measures the title angle, which can be translated to a pitch angle of the projector. Based on the depth data, the system determines the degree of non-flatness of the surface of the mat 200. Various techniques, including 3D point cloud and mapping algorithm may be used. If the degree of non-flatness is above an acceptability tolerance, the system 100 may inform the user to check if there is an object under the mat 200. Moreover, the system 100 may inform the user to move the mat 200 to another surface. If the degree of non-flatness is within an acceptability tolerance, but above a predetermined user threshold, the system 100 may automatically initiate a calibration process. As an example, the automatic (re)calibration may occur adjusting firmware settings of the projector assembly 184. If the degree of non-flatness is within the predetermined user threshold, a calibration process may not be necessary.

In one implementation, the depth data derived from the captured image of the mat 200 may be used for calculating elevation degree of the mat 200 relative to the projector assembly 184, which is directly correlated with the depth data. Further, this may help determine the relationship between the mat elevation and the pitch angle. When the touch sensitive area of the touch mat is on flat surface, the sensor bundle 164 has known elevation relative to the touch sensitive area. The tilt angle between the sensor bundle 164 and the touch mat 200 is known or constant when there is no depth change. The pitch angle may change if the surface has an angle, i.e., non-horizontal. The depth distribution determines the pitch angle, e.g., if the depth close to the display 152 increases, the pitch angle decreases. In another implementation, if the non-flat surface caused by an object under the touch mat 200, the pitch angle may change but the relationship between the mat elevation and pitch angle may be harder to determine.

Computing device 150 may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory RAM), any type of storage disc (e.g., a compact disc, a DVD, etc.), and the like, or a combination thereof. Further, any machine-readable storage medium described herein may be non-transitory.

Figure 10:
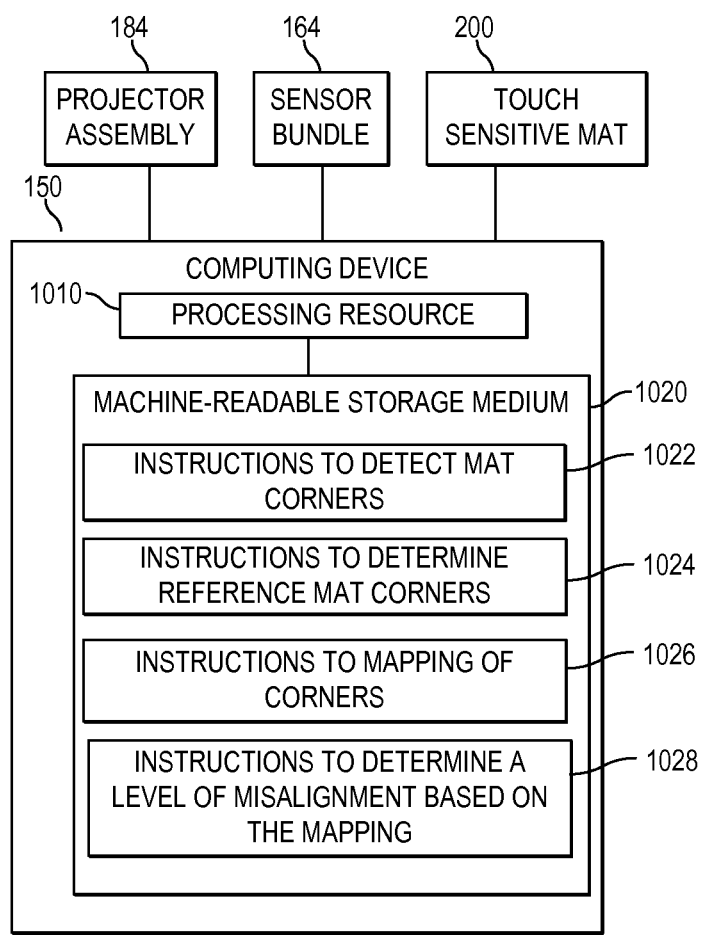
FIG. 10 is a block diagram depicting a memory resource and a processing resource in accordance with the principles disclosed herein.

FIG. 10 is a block diagram of an example computing device 150. In the example of FIG. 10, computing device 150 is communicatively connected to projector assembly 184, sensor bundle 164, and touch sensitive mat 200 (as described above), and includes a processing resource 1010, and a machine-readable storage medium 1020 comprising (e.g., encoded with) instructions 1022, 1024, and 1026. In some examples, storage medium 1020 may include additional instructions. In other examples, instructions 1022, 1024, 1026, and any other instructions described herein in relation to storage medium 1020, may be stored on a machine-readable storage medium remote from but accessible to computing device 150 and processing resource 1010. Processing resource 1010 may fetch, decode, and execute instructions stored on storage medium 1020 to implement the functionalities described below. In other examples, the functionalities of any of the instructions of storage medium 1020 may be implemented in the form of electronic circuitry, in the form of executable instructions encoded on a machine-readable storage medium, or a combination thereof. Machine-readable storage medium 1020 may be a non-transitory machine-readable storage medium.

In the example of FIG. 10, a computing system, such as computing system 100 described above in relation to FIG. 1, may comprise computing device 150, projector assembly 184, sensor bundle 164, and touch sensitive mat 200. In some examples, instructions 1022 may include instructions for detecting corners of a touch sensitive mat. Instructions 1024 may include instructions for determining a set of reference corners, and instructions 1026 may include instructions for mapping the detected corners of the touch sensitive mat with the set of reference corners. In particular, mapping may include comparing the detected corners of the touch sensitive mat with the set of reference corners. Further, instructions 1028 may include instructions for determining a misalignment based on the mapping. The storage medium 1020 may include additional instructions to realign mapping between the detected corners of the touch sensitive mat and the reference set of corners, which the corners of the touch sensitive mat stored from a past detection.

Figure 11:
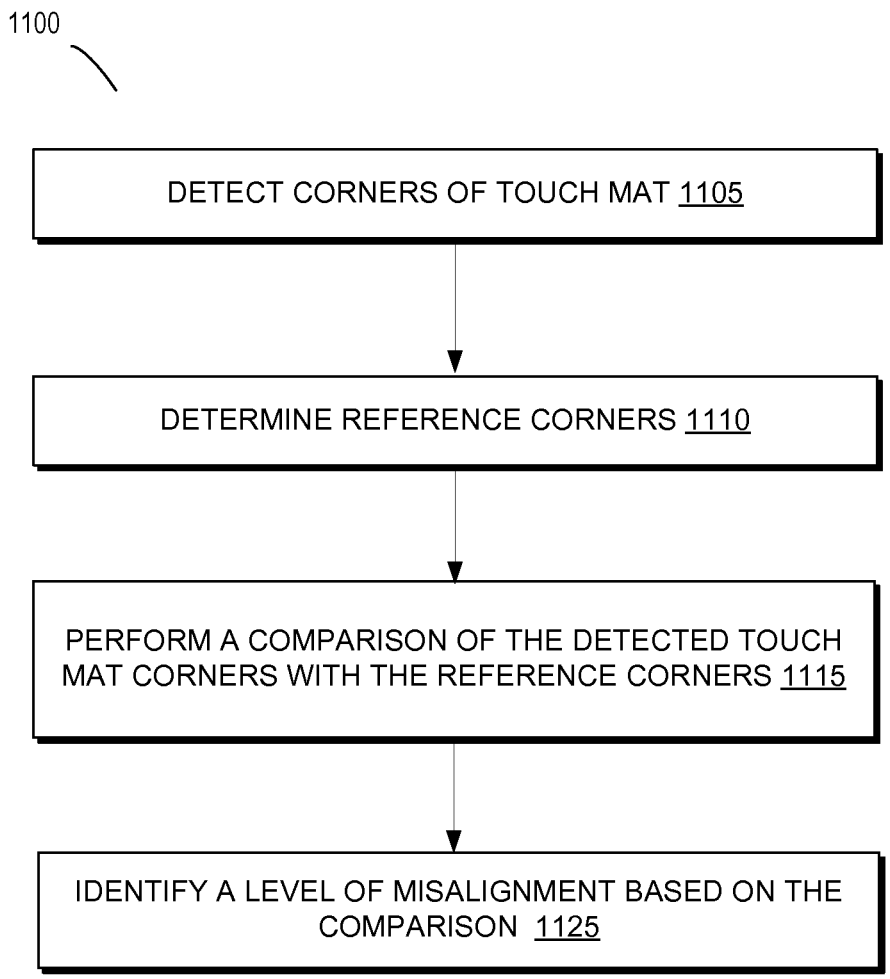
FIG. 11 is a flow diagram depicting steps to implement an example.

FIG. 11 is a flowchart of an example method 1100 to detect misalignment in the system 100. Although execution of method 1100 is described below with reference to computing system 100 of FIG. 1, other suitable systems for execution of method 1100 can be utilized. Additionally, implementation of method 1100 is not limited to such examples.

At 1105, one or more sensors from the sensor bundle 164 may detect corners of a touch sensitive mat. At 1110, the detected corners are compared with a set of reference corners. In one example, the reference corners may be the corners of the touch sensitive mat identified in the last image of the touch mat captured by the system 100. In another example, the reference corners may be the corners of the touch sensitive mat restored during the last time, they were mapped (e.g., homography). At 1115, the computing system 100 may determine a level of misalignment based on the comparison of the two sets of corners. Further, the computing system 100 may initiate a recalibration process depending on the level of misalignment.

Although the flowchart of FIG. 11 shows a specific order of performance of certain functionalities, method 1100 is not limited to that order. For example, the functionalities shown in succession in the flowchart may be performed in a different order, may be executed concurrently or with partial concurrence, or a combination thereof. In some examples, features and functionalities described herein in relation to FIG. 11 may be provided in combination with features and functionalities described herein in relation to any of FIGS. 1-10.

Figure 12:
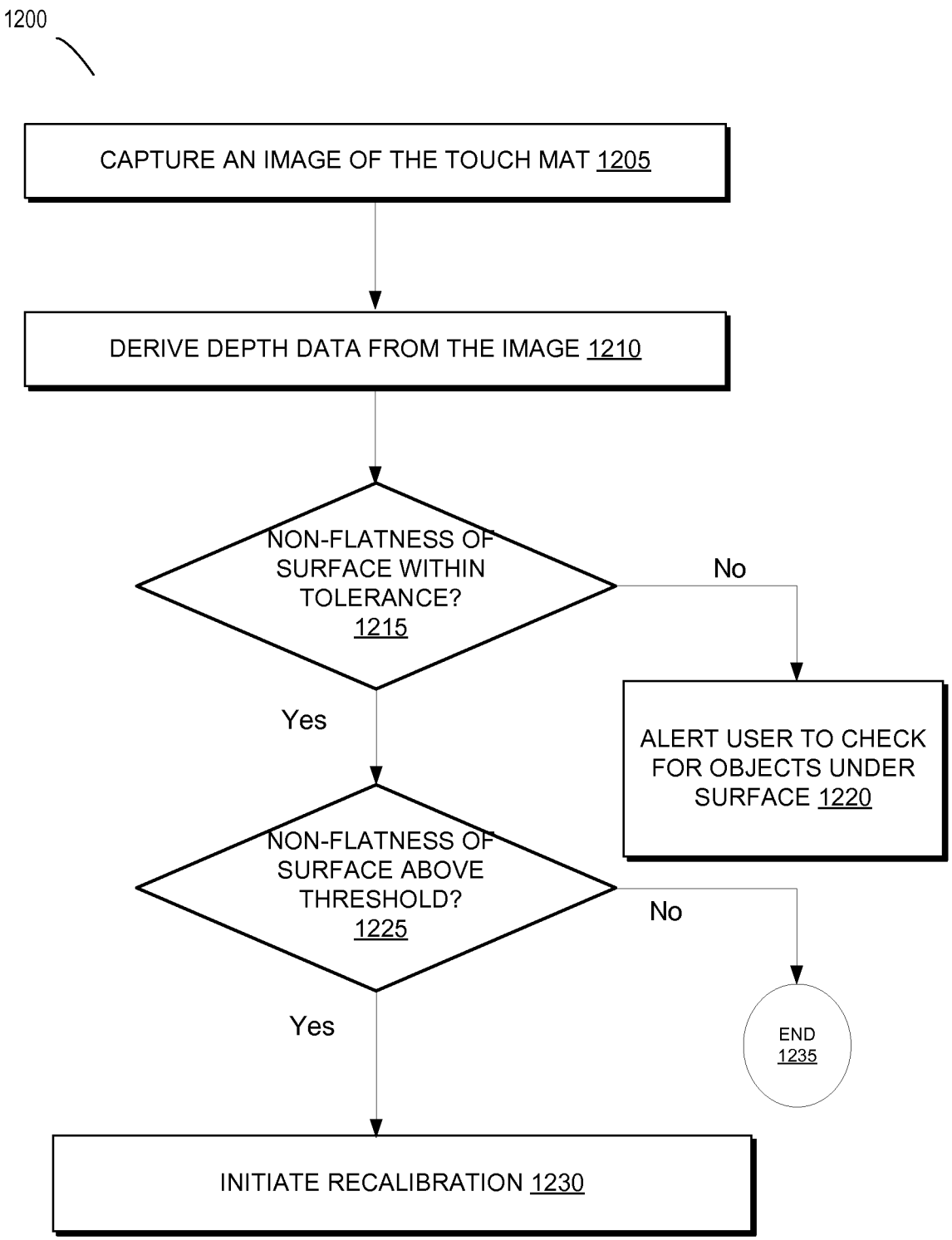
FIG. 12 is another flow diagram depicting steps to implement an example.

Further, the system 100 may check if there is possible misalignment due to non-flat surface that the touch mat is placed on. FIG. 12 is a flowchart of an example method 1200 to detect further misalignment due to non-flat surface. Although execution of method 1200 is described below with reference to computing system 100 of FIG. 1, other suitable systems for execution of method 1200 can be utilized. Additionally, implementation of method 1200 is not limited to such examples, and the method 1200 may be performed before the method 1100.

At 1205, the depth camera captures an image of the touch mat, and at 1210, depth data may be derived from the image, which states whether the touch mat is flat or non-flat. At 1215, the system determines whether the surface flatness is within an acceptable tolerance. If no, the system alerts the user of the system to check if there is an object under the touch mat or suggests moving to a different surface at 1220. If yes, at 1225, the system checks whether the surface non-flatness is larger than a user threshold (which may be defined by a user or pre-defined by the system). If yes, the system initiates a recalibration process at 1230. If no, the method ends at 1235.

In the manner described, through use of examples of a computer system 100 in accordance with the principles disclosed herein, an additional touch sensitive display may be projected onto a touch sensitive surface (e.g., surface 202) to provide dual screen capability for a computing device (e.g., device 150).

While device 150 has been described as an all-in-one computer, it should be appreciated that in other examples, device 150 may further employ the use of more traditional user input devices such as, for example, a keyboard and a mouse. In addition, while sensors 164a, 164b, 164c, 164d within bundle 164 have been described as each representing a single sensor or camera, it should be appreciated that each of the sensors 164a, 164b, 164c, 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A misalignment detection system, comprising:
a plurality of sensors;
a projector unit;
a computing device attachable to the projector unit and comprising a processor; and
a touch sensitive mat communicatively coupled to the computing device, the touch sensitive mat including a touch sensitive surface having a first spectral reflectance characteristic and a portion of a perimeter of the touch sensitive surface having a second spectral reflectance characteristic, wherein the computing device is to cause:
the plurality of sensors to differentiate the first spectral reflectance characteristic from the second spectral reflectance characteristic to detect corners of the touch sensitive mat;
the processor to compare the detected corners of the touch sensitive mat to a set of reference corners of the touch sensitive mat, the set of reference corners based on previous detection of the corners of the touch sensitive mat; and
the processor to determine a level of misalignment of the touch sensitive mat based on the comparison of the detected corners to the set of reference corners.

2. The system of claim 1, further comprising a support structure including a base, an upright member extending upward from the base, and a cantilevered top extending outward from the upright member and including a fold mirror and the plurality of sensors, wherein the projector unit is attachable to the upright member.

3. The system of claim 2, wherein a portion of the base of the support structure is to form a space between the portion of the base and a surface on which the touch sensitive mat is to lie, wherein an edge of the touch sensitive mat is received within the space.

4. The system of claim 1, wherein the computing device is further to cause the processor to initiate a calibration process based on the level of misalignment.

5. The system of claim 1, wherein the plurality of sensors detect the corners of the touch sensitive mat when the projector unit is in standby state.

6. The system of claim 1, wherein the set of reference corners are corners of the touch sensitive mat captured during a prior calibration process.

7. The system of claim 1, wherein the set of reference corners are corners of the touch sensitive mat restored through 2 homographies.

8. The system of claim 1, wherein the plurality of sensors to detect the corners of the touch sensitive mat comprises at least an RGB camera.

9. A method to detect misalignment of a touch sensitive mat, the method comprising:

detecting corners of the touch sensitive mat, including differentiating a first spectral reflectance characteristic of a touch sensitive surface of the touch sensitive mat from a second spectral reflectance characteristic of a portion of a perimeter of the touch sensitive surface;

determining a set of reference corners for the touch sensitive mat, the set of reference corners based on past detection of the corners of the touch sensitive mat;

performing a comparison of the detected corners of the touch sensitive mat with the set of reference corners for the touch sensitive mat; and determining a level of misalignment of the touch sensitive mat based on the comparison of the detected corners with the set of reference corners.

10. The method of claim 9, further comprising determining whether a projector unit associated with the touch sensitive mat is in standby mode, and detecting the corners of the touch sensitive mat if the projector unit is in the standby mode.

11. The method of claim 9, wherein determining the set of reference corners further comprises retrieving stored data associated with the corners of the touch sensitive mat.

12. The method of claim 11, wherein the stored data comprises captured images of the corners of the touch sensitive mat, the captured images captured during prior calibrations of the touch sensitive mat.

13. The method of claim 9, further comprising:

receiving an image of the touch sensitive mat;

deriving depth data from the image of the touch sensitive mat, the depth data providing information related to non-flatness of a surface that the touch sensitive mat lies on;

displaying an alert if the non-flatness of the surface is not within an acceptable tolerance; and initiating a calibration process if the non-flatness of the surface is within the acceptable tolerance and above a user threshold.

14. The method of claim 13, wherein the alert comprises a message to a user of the touch sensitive mat to check for an object under the touch sensitive mat or to move the touch sensitive mat to a different surface.

15. A non-transitory machine-readable storage medium comprising instructions executable by a processing resource of a computing system to detect misalignment of a touch sensitive mat, the instructions executable to:

newly detect corners of the touch sensitive mat based on differentiating a first spectral reflectance characteristic of a touch sensitive surface of the touch sensitive mat from a second spectral reflectance characteristic of a portion of a perimeter of the touch sensitive surface;

determine a set of reference corners associated with the touch sensitive mat, the set of reference corners based on previously identified corners of the touch sensitive mat;

perform mapping of the newly detected corners of the touch sensitive mat with the set of reference corners associated with the touch sensitive mat; and determine a level of misalignment of the touch sensitive mat based on the mapping of the newly detected corners with the set of reference corners.

16. The storage medium of claim 15, wherein the corners of the touch sensitive mat are corners of an area of the touch sensitive mat, wherein the area represents the touch sensitive surface of the touch sensitive mat.

* * * * *